United States Patent [19]

Chang et al.

[11] 4,202,845
[45] May 13, 1980

[54] SULFUR VULCANIZABLE ETHYLENE-VINYL ACETATE COPOLYMER ELASTOMERS

[75] Inventors: Eugene Y. C. Chang, Bridgewater; Robert Saxon, Princeton, both of N.J.

[73] Assignee: American Cyanamid Company, Stamford, Conn.

[21] Appl. No.: 962,414

[22] Filed: Nov. 20, 1978

[51] Int. Cl.² .................................... C08F 255/02
[52] U.S. Cl. .................................... 525/302
[58] Field of Search .................... 260/878 R

[56] References Cited

U.S. PATENT DOCUMENTS

| | | | |
|---|---|---|---|
| 3,111,500 | 11/1963 | Bartl | 260/878 R |
| 3,950,209 | 4/1976 | Kosaka | 260/878 R |
| 3,972,857 | 8/1976 | Kaiserman | 526/14 |
| 4,104,329 | 8/1978 | Abdou-Sabet | 260/878 R |
| 4,124,655 | 11/1978 | Koehnlein | 260/878 R |

*Primary Examiner*—Paul R. Michl
*Attorney, Agent, or Firm*—Frank M. Van Riet

[57] ABSTRACT

Copolymers of ethylene and vinyl acetate having grafted thereon a mixture of a major proportion of one or more acrylic acid esters and a minor proportion of an ethylenically unsaturated comonomer containing a cure-site for sulfur vulcanization, and the vulcanized elastomers obtained therefrom, are disclosed.

15 Claims, No Drawings

SULFUR VULCANIZABLE ETHYLENE-VINYL ACETATE COPOLYMER ELASTOMERS

BACKGROUND OF THE INVENTION

The copolymerization of ethylene and vinyl acetate is well-known; see Roedel, U.S. Pat. No. 2,703,794. In general, such copolymerization is effected by high pressure reaction of ethylene and vinyl acetate in an autoclave in the presence of a suitable initiator, such as ferrous sulfate, sodium bisulfite and water. Processes for the continuous polymerization of ethylene and vinyl acetate are also known; see U.S. Pat. No. 3,509,115 to French. The copolymers are also readily obtained by copolymerization of the monomers in the absence of water, e.g., in the presence of benzene; see Raetzsch and Musche, Plaste und Kautschuk, 21 (1), 16–18 (1974), Roedel, U.S. Pat. No. 2,519,791, and Hanford, U.S. Pat. No. 2,396,785, (Example 16). Furthermore, a comprehensive survey of ethylene and vinyl acetate copolymers is presented in "Ethylene and Its Industrial Derivatives", S. A. Miller, Edit., published by Ernest Benn, London, 1969, particularly pages 437–475, and in "Encyclopedia of Polymer Technology", Vol. 6, pages 387–420, published by John Wiley, New York, N. Y., 1967.

Copolymers of ethylene and vinyl acetate having a high ethylene content, e.g., greater than about 50 percent, particularly about 70–85 percent, are stiff and partially crystalline in the unmodified state. If the vinyl acetate content ranges between about 20 and 60 percent, the polymers are generally amorphous, somewhat flexible, and relatively transparent. These copolymers have found substantial commercial use, especially in the manufacture of water- and grease-resistant coatings for paper, modifiers for waxes, and in hot melt adhesives. The copolymers containing about 40–60 percent vinyl acetate exhibit rubbery properties and may be classified as elastomers. Although they do not contain a site for sulfur vulcanization, they can be cured with peroxides. These elastomers exhibit poor resistance to swelling when in contact with hydrocarbon oils, but good low temperature and mechanical properties. They also possess good oxidation resistance.

Peroxide curing, providing covalent cross-links between adjacent, substantially linear or branched chains, was demonstrated by Madge, Chem. and Ind. 1811 (1962). Peroxide curing is regarded by the rubber industry as an undesirable technique, as opposed to sulfur vulcanization. Operating hazards are often associated with the use of peroxides, they frequently have an objectionable odor and, more seriously, they are not readily adaptable to the broad formulation techniques developed for typical sulfur-based vulcanization systems. For these and other reasons, ethylene-vinyl acetate copolymers have found only limited use as elastomers despite the potentially attractive properties, mentioned above.

Kaizerman and Saxon, U.S. Pat. No. 3,972,857, describe modified ethylene-vinyl acetate copolymers containing an activated halogen atom cure-site for sulfur vulcanization. The polymers contain 35–80 percent ethylene and 0.2–4.5 percent, by weight, of chlorine or bromine, the remainder being vinyl acetate. The elastomers are made primarily by transesterification to introduce halogen-containing acetate groups into an ethylene-vinyl acetate copolymer, although it is also disclosed that they can be obtained by copolymerizing ethylene, vinyl acetate, and a halogen-containing vinyl monomer.

SUMMARY

The present invention provides sulfur vulcanizable ethylene-vinyl acetate copolymer elastomers having improved properties by grafting onto an ethylene-vinyl acetate copolymer, containing about 50 to 92 percent ethylene and 8 to 50 percent vinyl acetate, a mixture of monomers comprising a major proportion of one or more acrylic acid esters and a minor proportion of an ethylenically unsaturated comonomer containing a cure-site for sulfur vulcanization.

Graft polymers of ethylene-vinyl acetate are described in "Graft Polymerization of Vinyl Compounds on Ethylene-Vinyl Acetate Copolymers", Advances in Chemistry Series (91), 477 (1969).

The graft elastomers of the instant invention have the advantage of providing sulfur-vulcanizable ethylene-vinyl acetate copolymers which are more elastomeric than unmodified ethylene-vinyl acetate copolymers of the art. The graft elastomers of this invention have improved resistance to hydrocarbon oils, excellent low temperature properties (low Glass Transition Temperature, Tg) and the process for their preparation is simpler and more economical than the method disclosed by Kaizerman and Saxon, discussed above.

DESCRIPTION OF THE INVENTION INCLUDING EMBODIMENTS

The graft elastomers of the invention contain about 20 to 80 percent, by weight, of an ethylene-vinyl acetate copolymer, comprising about 50 to 92 percent ethylene and about 8 to 50 percent vinyl acetate and, grafted thereon, about 80 to 20 percent, by weight, of a mixture of (1) a major proportion of one or more acrylic acid esters and (2) a minor proportion of an ethylenically unsaturated comonomer containing a cure-site for sulfur vulcanization.

The ethylenically unsaturated comonomer which provides the cure-site for sulfur vulcanization can be either a halogen (e.g. bromine or chlorine) containing monomer or a carbon to carbon double bond containing monomer.

Preferably the ethylenically unsaturated comonomer which provides the cure-site to the elastomer is a halogen containing monomer. It is used in such an amount as to provide in the final graft elastomer between about 0.2 and 4.5% by weight halogen.

When the cure-site is provided by a comonomer containing carbon to carbon unsaturation (e.g. a vinyl or ethylene group) the comonomer should provide in the final graft elastomer from about 0.5 to about 5%, by weight, of unsaturation.

In both instances, i.e. where the cure-site providing comonomer is either halogen containing or unsaturation containing, sufficient monomer is used so as to create in the graft elastomer the amount desired and the remaining grafted monomer constitutes the acrylic ester or mixture of acrylic esters so as to create in the final graft elastomer the above set forth amount of grafted monomers.

The ethylene-vinyl acetate copolymers containing from about 8 to 50 percent vinyl acetate, preferably 15 to 30 percent vinyl acetate useful herein are available commercially and are well-known in the art. Small amounts of comonomers supplying carboxyl groups, e.g., up to about 5 percent, such as acrylic acid, methacrylic acid, maleic acid, and the like, may also be incorporated into the copolymers.

Particularly useful monomers for grafting onto the ethylene-vinyl acetate copolymers are the $C_2$-$C_8$ alkyl acrylates such as ethyl acrylate, t-butyl acrylate, cyclohexyl acrylate, n-octyl acrylate and the like.

The mixture of acrylate monomers which are to be grafted onto the ethylene-vinyl acetate backbone polymer may include, in addition to a major proportion of acrylic acid esters and a minor proportion of a cure-site containing monomer, a minor amount of one or more ethylenically unsaturated, copolymerizable monomers, such as acrylonitrile, styrene, vinyl chloride, and the like.

Active halogen containing monomers which may be used include those represented by the formula:

$$CH_2=CH-R \qquad (I)$$

Illustrative examples of R include:

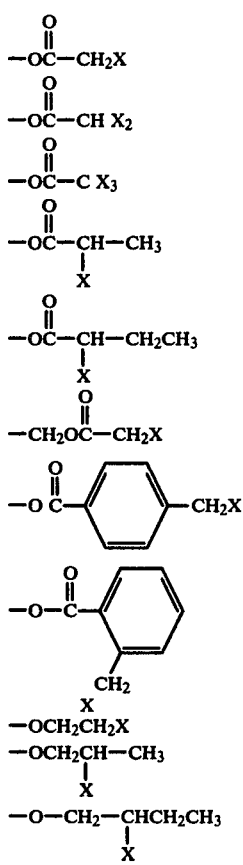

wherein X is a halogen atom, preferably chlorine or bromine. Nonhalogen-containing monomers which may be grafted onto the ethylene-vinyl acetate copolymers to provide carbon to carbon unsaturation cure-sites for sulfur vulcanization include such polyunsaturated monomers as allyl acrylate, crotyl acrylate, ethylidene norbornene, and the like. Vinyl chloroacetate is the preferred cure-site-containing grafting comonomer.

The grafted polymer segments of the elastomers of the present invention are prepared by a grafting procedure whereby a mixture of the acrylic acid esters and the cure-site-containing monomer are polymerized or grafted onto the ethylene-vinyl acetate copolymer backbone. The monomers to be grafted, along with the ethylene-vinyl acetate copolymer in powder or pellet form, are preferably first heated to about 40°–90° C. to swell the monomers into the polymer. A suitable free radical catalyst, such as tertiary butyl peroctoate, benzoyl peroxide and the like, is then added, and the monomers are polymerized at about 80° C. The polymer is then isolated, washed, and dried in a known manner.

The graft elastomers are compounded by conventional means, e.g., by Banbury mixer, two-roll rubber mill, etc. Sulfur, sulfur donors, accelerators, antioxidants, carbon black, other fillers and additives, as are commonly employed in the formulation of acrylic elastomers and the like, may be used in the vulcanization system; notably, the methods of Mihal, U.S. Pat. No. 3,458,461, and Behrens, U.S. Pat. No. 3,506,624, may be used to vulcanize the elastomers. The compounded vulcanizable elastomer may then be fabricated into useful articles by conventional means, e.g., by compression molding,, extrusion, and the like.

EXAMPLE 1

A slurry of 35 parts of a copolymer of 75 percent ethylene and 25 percent vinyl acetate, 37 parts of ethyl acrylate, 10 parts of vinyl chloroacetate, and 280 parts of water is stirred at 60° C. for about one hour to swell the polymer pellets. Then, 0.4 part of tertiary butyl peroctoate is added and the reaction mixture is heated for 2 hours at 80° C. During the polymerization reaction, the swollen particles fuse into a single mass, which is isolated, washed, and then cut into small pieces. A total of 38 parts of monomers polymerize, representing a yield of about 80%. Chlorine analysis shows 1.43% chlorine in the graft copolymer (theory=2.95%).

The grafted polymer is compounded on a standard two-roll rubber mill with 45 parts of carbon black, 1.5 parts of stearic acid, 1.5 parts of di-$\beta$-naphthyl-p-phenyl-enediamine (antioxidant), 0.3 part of sulfur and 6 parts of a 50% active blend of sodium 2-ethylhexanoate. The compounded polymer is cured into a sheet by compression molding at 330° F. for 30 minutes. The physical properties are given below:

| | |
|---|---|
| Hardness, Shore A | 90 |
| Tensile strength, psi | 2180 |
| Elongation, % | 225 |
| Volume Swell, %* | 53 |
| Tg (TMA), °C.** | −31 |

*70 Hours @ 150° C. in ASTM No. 3 Oil; ASTM D471-55T
**Thermomechanical analysis

EXAMPLE 2

Following the procedure of Example 1, 40 parts of a copolymer of 82% ethylene and 18% vinyl acetate, 39 parts of ethyl acrylate, 9 parts of vinyl chloroacetate, and 40 parts of water are heated at 80° C. for 2 hours using 1.8 parts of tertiary butyl peroctoate catalyst. The polymer pellets do not fuse together as they did in Example 1. Yield is 83%. Fractionation of the polymer in ethyl acetate shows that the grafting efficiency is about 70%.

When compounded and cured as in Example 1, the grafted polymer exhibits the following properties:

| | |
|---|---|
| Hardness, Shore A | 94 |
| Tensile strength, psi | 2365 |

| | |
|---|---|
| Elongation, % | 130 |
| Volume swell, % | 51 |
| Tg (TMA), °C. | −31 |

EXAMPLE 3

In this example the copolymer is a terpolymer of about 72% ethylene, about 28% vinyl acetate and an unsaturated carboxylic acid containing monomer in an amount to provide an acid number of 6.

Following the procedure of Example 1, 50 parts of the terpolymer, 42 parts of ethyl acetate, 8 parts of vinyl chloroacetate, 0.1 part of dodecyl mercaptan, and 2 parts of tertiary butyl peroctoate are polymerized in 350 parts of water containing 12 parts of sodium chloride. Yield of polymer is 96%.

The polymer is compounded with 60 parts of carbon black, 12 parts of a fine particle silica, 10 parts of an epoxy resin (essentially the diglycidyl ether of Bisphenol A), 0.25 part of sulfur, 8 parts of a 50% active blend of sodium 2-ethylhexanoate, 2 parts of stearic acid, and 4 parts of an antioxidant (reaction product of acetone and diphenylamine on carbon black).

The compounded elastomer is cured for 15 minutes at 330° F., followed by a post-cure in an oven for 4 hours at 176° C. The physical properties of the polymer are given below:

| | |
|---|---|
| Hardness, Shore A | 85 |
| Modulus @ 100%, psi | 1910 |
| Tensile strength, psi | 2325 |
| Elongation, % | 125 |
| Volume swell, % | 51 |

Following aging for 70 hours at 176° C., the following properties are obtained:

| | |
|---|---|
| Hardness, Shore A | 91 |
| Tensile strength, psi | 2250 |
| Elongation, % | 80 |
| Tg (TMA), °C. | −31.5 |

EXAMPLE 4

To 100 parts of an 82% ethylene-18% vinyl acetate copolymer suspended in 1000 parts of water containing 50 parts of sodium chloride at 70° C. is added a monomer mixture containing 280 parts of a (50/50) mixture of ethyl acrylate and butyl acrylate, 20 parts of vinyl chloroacetate, 0.2 part of dodecyl mercaptan, and 0.8 part tertiary butyl peroctoate. The monomer mixture is added in 4 portions, each about 45 minutes apart. Following the final addition, the reaction mixture is allowed to react for an additional 2 hours. The product, 381 parts, represents a yield of 94% of graft copolymer having a chlorine content of 0.73%.

100 parts of the polymer are compounded with 50 parts of carbon black, 2 parts of di-β-naphthyl-p-phenyl-enediamine, 1 part of stearic acid, 0.25 part of sulfur and 8 parts of a 50% active blend of sodium 2-ethylhexanoate. When the elastomer is cured as described in Example 1, the following properties are obtained:

| | |
|---|---|
| Hardness, Shore A | 82 |
| Tensile strength, psi | 1660 |
| Elongation, % | 238 |
| Volume swell, %* | 83 |
| Tg (TMA), °C. | −30 |

*Automatic transmission oil; 70 hours at 150° C.

When the cured elastomer is aged for 7 days at 176° C., the following properties are obtained:

| | |
|---|---|
| Hardness, Shore A | 84 |
| Tensile strength, psi | 1550 |
| Elongation, % | 215 |

EXAMPLE 5

To 80 parts of an ethylene-vinyl acetate copolymer containing about 50% vinyl acetate, suspended in a mixture of 400 parts of water, 20 parts of sodium chloride, 0.18 part of Bentonite clay, and 0.34 part of tricalcium phosphate is added a monomer mixture of 32.8 parts of ethyl acrylate, 7.2 parts of vinyl chloroacetate, and 0.3 parts of tertiary butyl peroctoate. The polymerization is conducted for 1.5 hours at 70° C., yielding 107 parts, representing a yield of 68%.

When the elastomer is compounded and cured as in Example 4, the following properties are obtained:

| | |
|---|---|
| Hardness, Shore A | 77 |
| Tensile strength, psi | 1370 |
| Elongation, % | 440 |
| Volume swell, %* | 82 |
| Tg (TMA), °C. | −17 |

*Automatic transmission oil; 70 hours at 150° C.

After aging for 7 days at 176° C., the following properties are obtained:

| | |
|---|---|
| Hardness, Shore A | 84 |
| Tensile strength, psi | 1418 |
| Elongation, % | 300 |

EXAMPLE 6

The procedure of Example 1 is again followed except that the ethylene/vinyl acetate copolymer contains 92% ethylene and 8% vinyl acetate. The resultant vulcanized elastomer exhibits properties similar to those set forth therein.

EXAMPLES 7–9

The procedure of Example 3 is again followed except that the vinyl chloroacetate is replaced by (7) vinyl bromoacetate, (8) allyl chloroacetate, and (9) 2-chloroethyl vinyl ether. In each instance, the vulcanized elastomer produced exhibits properties camparable to those set forth therein.

EXAMPLE 10

All of the features of Example 4 are again followed except that the vinyl chloroacetate is replaced by sufficient allyl acrylate so as to create about 0.5% carbon to carbon unsaturation in the resultant grafted elastomer. Upon vulcanization, a cured elastomer having excellent properties is recovered.

EXAMPLES 11 AND 12

When the procedure of Example 1 is again followed except that the amount of vinyl chloroacetate is adjusted so as to provide the resultant grafted elastomers with (11) 4.5% chlorine, and (12) 0.5% chlorine, cured elastomers with excellent properties are recovered.

EXAMPLE 13

When the allyl acrylate content of the grafted polymer of Example 10 is adjusted by charging sufficient allyl acrylate so as to provide 5% unsaturation in the resultant graft elastomer, an excellent cured elastomer results.

EXAMPLES 14 AND 15

The procedure of Example 2 is again followed except that the ethyl acrylate is replaced by (14) t-butyl acrylate and (15) n-octyl acrylate. Similar results are achieved upon vulcanization of the resultant grafted elastomer.

We claim:

1. A sulfur vulcanizable elastomer composition comprising:
    (A) from about 20 to 80 percent by weight of a copolymer of about 50 to 92 percent ethylene and 8 to 50 percent vinyl acetate, and grafted thereon
    (B) about 80 to 20 percent by weight of a mixture of a major proportion of one or more $C_2$–$C_8$ alkyl monoesters of acrylic acid and a minor proportion of an ethylenically unsaturated comonomer containing a cure-site for sulfur vulcanization.

2. An elastomer according to claim 1 wherein the ethylenically unsaturated comonomer containing a cure-site for sulfur vulcanization is a halogen containing compound.

3. An elastomer according to claim 1 wherein the ethylenically unsaturated comonomer containing a cure-site for sulfur vulcanization is a polyunsaturated monomer.

4. An elastomer according to claim 2 wherein the halogen content of said composition is between about 0.2 and 4.5 weight percent.

5. An elastomer according to claim 3 wherein the halogen-containing compound is vinyl chloroacetate.

6. An elastomer according to claim 1 wherein said monomer mixture comprises a major proportion of ethyl acrylate.

7. An elastomer according to claim 1 wherein said monomer mixture comprises a major proportion of a mixture of ethyl acrylate and butyl acrylate.

8. An elastomer according to claim 1 wherein said monomer mixture comprises a major portion of ethyl acrylate and said ethylenically unsaturated comonomer is vinyl chloroacetate.

9. An elastomer according to claim 1 wherein said monomer mixture comprises a major portion of a mixture of ethyl acrylate and butyl acrylate and said ethylenically unsaturated comonomer is vinyl chloroacetate.

10. A method for the preparation of a sulfur vulcanizable elastomer which comprises forming a mixture of 20 to 80 percent, by weight, of a copolymer of 50 to 92 percent ethylene and 8 to 50 percent vinyl acetate, and 80 to 20 percent, by weight, of a mixture of a major proportion of one or more $C_2$–$C_8$ alkyl monoesters of acrylic acid and a minor proportion of an ethylenically unsaturated comonomer containing a cure-site for sulfur vulcanization, adding thereto a suitable amount of a free radical catalyst and polymerizing said mixture of monomers in the presence of said copolymer at a temperature of from about 40° C. to 90° C.

11. The sulfur cured composition of claim 1.
12. The sulfur cured composition of claim 2.
13. The sulfur cured composition of claim 3.
14. The surfur cured composition of claim 5.
15. The sulfur cured composition of claim 9.